(12) United States Patent
Miksic et al.

(10) Patent No.: US 6,420,470 B1
(45) Date of Patent: Jul. 16, 2002

(54) FLAME RETARDANT FILMS

(75) Inventors: Boris A. Miksic, North Oaks; Alex Sobkin, Woodbury; Anna Miksic, North Oaks, all of MN (US)

(73) Assignee: Cortec Corporation, St. Paul, MN (US)

( * ) Notice: Subject to any disclaimer, the term of this patent is extended or adjusted under 35 U.S.C. 154(b) by 0 days.

(21) Appl. No.: 09/573,864

(22) Filed: May 18, 2000

Related U.S. Application Data

(63) Continuation-in-part of application No. 09/322,406, filed on May 28, 1999, now abandoned.

(51) Int. Cl.$^7$ .............................. C08J 3/00; C08K 3/10; C08K 3/16; C08K 5/06; C08L 23/06

(52) U.S. Cl. ...................... 524/411; 428/34.9; 428/35.3; 428/35.8; 428/461; 524/86; 524/87; 524/91; 524/371

(58) Field of Search ................................ 428/34.9, 35.3, 428/35.8, 461; 524/86, 87, 91, 371, 411

(56) References Cited

U.S. PATENT DOCUMENTS 4,616,049 A * 10/1986 Thompson et al. ......... 523/212
5,855,975 A * 1/1999 Miksic et al. .............. 428/35.8

* cited by examiner

*Primary Examiner*—Patrick D. Niland
(74) *Attorney, Agent, or Firm*—Haugen Law Firm PLLP

(57) ABSTRACT

A plastic film or laminates comprising films blended with flame retardants and corrosion inhibitors to provide simultaneous flame retardancy and corrosion protection for metallic particles when enclosed or packaged in envelopes comprising such films. The additives, while typically mutually antagonistic, are compatible when the flame component is a mixture of an antimony oxide such as antimony trioxide, antimony pentoxide, or zinc borate with a bromoaryl compound commonly bromoaryl having a bromine content ranging from between 36% to 75% and selected from group consisting of decabromodiphenyl oxide, poly (dibromostyrene) and bis-(tribromophenoxy ethane) and with the antimony oxide component in the flame retardant mixture being present in an amount such that the molar ratio of the antimony or zinc to bromine is such that for each mole of the antimony or zinc, approximately between about 2.5 and 3.5 moles of bromine are present; said plastic resin film consisting of a blend of from between about 8% and 12% flame retardant component, from between about 0.5 and 1.5% corrosion inhibiting compound, balance polyethylene resin. An anti-static component may also be added. These films may be laminated to form composites with high concentrations of corrosion inhibitors on the interior layers and high concentrations of flame retardant on the external layers.

13 Claims, No Drawings

FLAME RETARDANT FILMS

CROSS-REFERENCE TO RELATED APPLICATION

This application is a continuation-in-part application of our application Ser. No. 09/322,406, filed May 28, 1999, entitled "FLAME RETARDANT FILM WITH CORROSION PROTECTION", now abandoned.

BACKGROUND OF THE INVENTION

The present invention relates to flame retardant corrosion resistant polyethylene films, with the films preferably being in a laminated structure which shrinks or contracts upon application of heat to provide a tight fitting enveloping protective enclosure about large articles such as vehicles or other equipment during periods of non-use. These new films have the functions of providing both flame retardancy while simultaneously preserving the function of corrosion protection and being arranged to be incorporated in a laminate structure to provide tight-fitting enveloping protective enclosures about metallic articles when enclosed or packaged in these films. An anti-static component as well as an ultra-violet inhibitor may be added to the films of the invention without sacrifice of any of their desirable properties.

Flame retardancy in both films and textiles has become a necessity for certain articles with a number of applications being mandated by law. Similar mandates along with some requirements have been established by and for certain air carriers in connection with the fabrics employed within their interiors, and for many exhibition procedures. Flame retardancy in films is achieved by incorporating additives such as antimony oxides, certain borax salts and halogenated organics, all of which retard the flame propagation. A standard has been established as NFPA-701 and laboratories have been certified that approve articles and issue a certificate of conformance.

Paper and films that incorporate flame retardants have been available for many years. Paper coatings comprising corrosion inhibitors (hereafter sometimes referred to as "VCI") were initially developed about 1950. Selected VCI corrosion inhibitors in films that function as a source for volatile corrosion inhibitors became available commercially about 1980. Certain features of these two concepts along with certain other added features comprise the primary elements of the present invention. Among the added elements are the selection of flame retardant-corrosion resistant polyethylene films that shrink or contract upon application of heat, and also selection of certain of these films to be employed in a multi-layer laminate form.

The problem of blending the flame retardant (hereafter FR) chemicals with suitable VCI chemicals has been overcome with careful selection of components having preferred molecular structures. Chemicals commonly used for flame retardancy are mutually antagonistic when combined with typical VCI chemicals, with resulting reactions which either negate or substantially reduce their utility. In addition, many of the flame retardant chemicals are corrosive to metals and accordingly cannot be used in packaging metals. In the present arrangement, a multi-layer laminate such as a three-layer laminate with the interior or article-contacting film being blended with a corrosion inhibitor, and with the outer or exterior film containing flame retardant chemicals is especially useful. Additionally, the thermal properties of the films may be selected so that the resultant laminate is both flame retardant and corrosion resistant, while at the same time possessing the property of shrinking upon application of heat to provide tight-fitting enveloping protective enclosures. Certain polyethylene films, which are commercially available, possess the property of shrink capability for shrink-wrapping applications. In certain military applications, it may be both necessary and practical to utilize flame contact with the film in order to achieve the thermal shrinking. In this connection, it is believed that certain films prepared pursuant to the present invention are in compliance with the standards established by the National Fire Protection Association (NFPA). In certain applications, it may be desirable to utilize graded amounts of flame retardants and corrosion inhibitors in the individual layers, with a desirable arrangement being to provide a higher concentration of flame retardant compounds in the outer two films of a four-film laminate, with the vapor phase corrosion inhibitors being primarily concentrated in the inner two layers.

SUMMARY OF THE INVENTION

In accordance with the present invention, it has been found that with a proper selection of films incorporating VCI chemicals and flame retardant chemicals along with the selection of multi-layer laminates of these films, a dual function film is obtained that provides flame retardancy and provides complete and long term corrosion protection to articles packaged therein. In multi-layer co-extruded films, the interior film is preferably blended with the corrosion inhibitor, while the exterior or outer film layer is blended with a flame retardant chemical.

The most effective flame retardant compositions are produced when colloidal antimony pentoxide ($Sb_2O_5$) is blended with halogen containing compounds preferable at a mole ratio of about 3:1. Antimony trioxide ($Sb_2O_3$) may also be utilized effectively in the same mole ratio.

Many brominated compounds ranging in percent bromine from a high of 75% bromine to a low of 36% are available commercially, with certain of these compounds being available from Great Lakes Chemical Corp. of West Lafayette, Indiana. Combinations of halogenated phosphate and phosphated esters with phosphorous content ranging from 6.5% to 17% are also available. Suitable flame retardant chemicals in this group are also available from Dow Chemical under the trade designation "Derkanes", from Interplastic under the trade designation "Co-Rezyn", and from Ashland under the trade designation "Hetron" and from Reichold under the trade designations "Dion" and "Atlac". Volatile corrosion inhibitor chemicals (VCI) that are effective are amine and ammonium salts, such as cyclohexylammonium benzoate, ethanolamine benzoate, amine salts of sebacic acid, and ammonium benzoate. Corrosion inhibitors that are also effective are sodium molybdate, sodium sebacate, and sodium nitrite.

Careful selection and mixing of the components is essential as the manufacturing process includes exposure to two separate heat cycles and it is imperative that the VCI chemicals and flame retardant chemicals be retained and do not react or otherwise form reaction products while undergoing both heat cycles.

In most cases, optimum flame retardant performance in a halogen/antimony system is attained when the halogen and antimony are present in a molar ratio such that there are three moles of halogen present per mole of antimony. Mole ratios between about 2.5:1 to 3.5:1 may be useful. For example, decabromodiphenyl oxide has a bromine content of 83%, and a melting point of about 300° C.–315° C. which makes it particularly inert through both heat cycles. Antimony oxide reacts with halogen acids to form volatile compounds in the presence of high heat and flame to form volatile compounds that terminate combustion reactions and extinguish flames. When the decabromodiphenyl oxide (DBO) was used in a formulation with antimony pentoxide in a ratio of 3 parts DBO to 1.3 part antimony pentoxide and thereafter blended with about 1 part corrosion inhibitor chemicals, a suitable final blend was obtained for the initial twin screw masterbatch preparation. Other high melting halogenated compounds are also available that have the low volatility necessary for the heat processing operations. A melting point of at least 200° C. is desired in both the flame retardant and VCI chemicals when used in applications pursuant to the present invention.

Therefore, it is a primary object of the present invention to provide an improved flame retardant film which incorporates corrosion inhibitors, thereby providing the dual function of flame retardancy and corrosion protection.

It is yet a further object of the present invention to provide an improved flexible film with flame retardant properties, and wherein the film contains corrosion inhibitors which serve to provide an added element of protection to metallic components with surfaces that are reasonably likely to come into contact with the film.

It is still a further object of the present invention to provide an improved flexible polyethylene film in laminate form with flame retardant and corrosion inhibiting properties, and wherein the inner film in the laminate contains corrosion inhibitors, and wherein the outer or exterior film in the laminate contains a flame retardant component, and wherein the polyethylene film possesses the property of shrinking upon exposure to thermal energy.

Other and further objects of the present invention will become apparent to those skilled in the art upon a study of the following specification and appended claims.

DESCRIPTION OF THE PREFERRED EMBODIMENTS

In accordance with one preferred embodiment of the present invention, masterbatch formulation techniques are utilized to prepare a masterbatch of flame retardant and VCI components held within a low density polyethylene matrix. Thereafter, the masterbatches are mixed and/or blended as appropriate to a working formulation in order to produce films in accordance with the present invention.

The following examples provide a description of the steps to be undertaken in the preparation and/or fabrication of masterbatches and films pursuant to the present invention.

(A) MASTERBATCH PREPARATION

A twin screw extruder operating at a temperature range of 300° F. to 350° F. was used to produce a masterbatch of flame retardant and VCI chemicals in low density polyethylene. These masterbatches were further blended with the polyethylene and blown films were produced at a temperature range of 325° F. to 350° F.

Specific examples of masterbatch formulations are set forth in the following examples.

EXAMPLE I

A suitable FR-VCI masterbatch was prepared from the following components and chemicals:

| Component | Parts by Weight |
| --- | --- |
| Decabromodiphenyl oxide | 24 parts |
| Antimony pentoxide | 9 parts |
| Dicyclohexylammonium nitrate | .32 parts |
| Benzotriazole | .32 parts |
| Sodium molybdate | 3.44 parts |
| Sodium nitrite | 1.33 parts |
| LDPE polyethylene | 61.59 parts. |

EXAMPLE II

A suitable FR-VCI masterbatch was prepared from the following compounds and chemicals:

| Component | Parts by Weight |
| --- | --- |
| Poly (dibromostyrene) (available from Great Lakes Chemical under the trade designation "PDBS-80") | 30 parts |
| Antimony pentoxide | 10 parts |
| Sodium sebacate | 1 part |
| Cyclohexylammonium benzoate | 1 part |
| Sodium molybdate | 3 parts |
| Sodium nitrite | 2 parts |
| LDPE polyethylene | 53 parts. |

EXAMPLE III

A suitable flame retardant/VCI masterbatch was prepared from the following components and chemicals:

| Component | Parts by Weight |
| --- | --- |
| Tribromophenoxy ethane (available from Great Lakes Chemical under the trade designation "FI-680" | 26 parts |
| Antimony pentoxide | 8 parts |
| Ammonium salt of sebacic acid | 2 parts |
| Monoethanolammonium benzoate | 1.5 parts |
| Potassium molybdate | 3.5 parts |
| LDPE polyethylene | 59 parts. |

EXAMPLE IV

A non-halogenated masterbatch can be prepared utilizing Zinc borate with such material being available under the Trade designation "Firebrake 2B", from U.S. Borax and Chemical Corp. of Los Angeles, Calif. This powder has the chemical formula: $2\ ZnO.3B_2O_3.3.5\ H_2O$ and the water of dehydration is stable to 290° C. which makes it particularly useful for film extrusion temperatures of about 350° F.

A suitable FR-VCI masterbatch was prepared as follows:

| Component | Parts by Weight |
| --- | --- |
| Firebrake 2B | 30 parts |
| Sodium nitrite | 2 parts |
| Benzotriazole | .5 parts |
| Sodium molybdate | 4 parts |

-continued

| Component | Parts by Weight |
| --- | --- |
| Dicyclohexylammonium nitrate | .5 parts |
| LDPE polyethylene | 63 parts. |

This masterbatch produced with Firebrake is blended with LDPE polyethylene at a ratio of 15 parts masterbatch to 100 parts polyethylene to make a mixture suitable for producing a flame retardant VCI film.

The masterbatches of the above Examples I through IV are further blended with LLDPE and extruded at a temperature range of about 350° F. to produce films that were both flame retardant and produced excellent results when tested in the appropriate testing procedures for corrosion resistance films.

EXAMPLE V

Masterbatches containing certain of the active flame retardant ingredients which find utility pursuant to the present invention are also available commercially, and a particularly suitable one is "Endura PE-100" produced by the Polymer Products Co. of Stockerton, Pa. This masterbatch contains the following components percent by weight:

| Component | Percent by Weight |
| --- | --- |
| Antimony trioxide | 15% |
| Decabromodiphenyl oxide | 65% |
| Polyethylene | 20%. |

The masterbatch of this example can be further blended with a VCI masterbatch prepared from the following:

| Component | Parts by Weight |
| --- | --- |
| Benzotriazole | 1.5 parts |
| Sodium molybdate | 9 parts |
| Sodium nitrite | 3 parts |
| Dicyclohexylammonium nitrate | 1.5 parts |
| Polyethylene | 85 parts. |

After suitable mixing of the FR masterbatch and VCI masterbatch, films can be extruded as needed and/or required.

EXAMPLE VI

If desired, and when the antimony oxide and bromoaryl compounds do not provide sufficient anti-static properties, an effective amount of anti-static additive can also be added to masterbatches of the above examples if that property is needed. Although the antimony oxide and borox compounds function to some degree to reduce or release static in films, more conventional anti-static agents can be incorporated. A class of chemicals that have been found to not interfere with the combined flame retardancy function in the film forming compositions and VCI function are the substituted ethanol amides of fatty acids.

| Component | Parts by Weight |
| --- | --- |
| Tribromophenoxy ethane (available from Great Lakes Chemical under the trade designation "FI-680") | 26 parts |
| Antimony pentoxide | 8 parts |
| Lauric diethanolamide (available from Chemax, Inc. of Greenville, South Carolina under the trade designation "AC-1000") | 8 parts |
| Ammonium salt of sebacic acid | 2 parts |
| Monoethanolammonium benzoate | 1.5 parts |
| Potassium molybdate | 3.5 parts |
| LDPE polyethylene | 59 parts. |

This masterbatch containing the anti-static component is further blended with 100 parts of polyethylene to produce a mixture suitable for film extrusion. Those of conventional skill and wisdom are able to readily determine the quantity anti-static additive to be employed effective in the finished film product.

B. FILM PREPARATION

Films were prepared from the masterbatch described in Example I as follows:

Film #1—A 8-mil film was prepared from 67 parts of LDPE blended with 33 parts of Example I masterbatch. The 8-mil film was found to possess reasonable sealing properties and showed excellent results in four different corrosion resistance tests on carbon steel, copper, and aluminum.

Film #2—A 5-mil film was prepared from 67 parts of LDPE blended with 33 parts of Example I masterbatch. The 5-mil film showed good sealability and excellent results in corrosion testing. This 5-mil film was tested by a commercial laboratory for flame resistance. Three different flame criteria were tested, and this film was found to pass all three categories. The properties were such that this film was certified as passing NFPA-701-1996 fire tests for flame resistant films.

Film #3—A 10-mil film was prepared from 80 parts of LDPE blended with 20 parts of Example I masterbatch. The 10-mil film was somewhat more difficult to seal due to the combination of relatively heavy gauge thickness and high loading of chemicals. The corrosion tests were sufficiently successful so as to be encouraging.

C. FILM LAMINATES

A shrink film for shrink wrapping applications especially useful for the long term storage of large metallic articles such as military vehicles during periods of non-use is prepared by incorporating a small amount of pigment and ultra violet inhibitor into the resins used in the film preparation. This shrink film is prepared in co-extruded films or layers arranged in laminate form, with the laminate structure possessing the property of shrinking upon application of heat. The incorporation of flame retarding chemicals in the present invention also provides a mechanism for safely shrinking the film with open flame blow torches. This laminate structure, when employed in such a process, is especially useful for fast efficient application in remote military stations. The heavy loading of VCI chemicals in the inner layer also provides maximum corrosion protection over extended periods of time.

Film #4—A 10-mil co-extruded film designed for extended storage of military equipment is prepared as follows:

(1) The outer layer (3+mils) was selected to be the most flame retardant with 15 parts of non-halogenated flame retardant component employed in Example IV, and 2.25 parts ultra violet inhibitor additive extruded with 82.75 of low and ultra low density polyethylene. The ultra violet absorber used was obtained from UVTEC Inc. of Arlington, Tex. under the trade designation "AC9922". In certain applications, halogenated flame retardants may also be employed, such as those disclosed and utilized in the formulations in Examples I, II and III hereinabove.

(2) The middle layer (3+mils) contained 78 parts low and ultra low density polyethylene, 10 parts non halogenated flame retardant component employed in Example IV, 2 parts ultra violet inhibitor additive, 2 parts pigment, and 8 parts of the VCI masterbatch described in Example V.

(3) The inner layer (3+mils) contains the largest amount of vapor corrosion chemical so as to provide maximum corrosion protection to the enclosed equipment. The ratios of ingredients are as follows in the inner layer:
   (a) 15 parts VCI masterbatch from Example V herein;
   (b) 5 parts flame retardant additive from Example V herein;
   (c) 2 parts ultra violet inhibitor additive extruded with 82.75 of low and ultra low density polyethylene;
   (d) 1.5 parts color additive to create a tan or sand tone to the composite; and
   (e) 76.5 parts low and ultra low density polyethylene.

The color additives are widely utilized in the art, and are well known to those of ordinary skill, with the color or tone selection being determined at least in part by the ultimate application. Additionally, ultra low density polyethylene is commercially available.

As is apparent, this new flame retardant vapor corrosion inhibitor film has been constructed to shrink, protect enclosed articles from ultra violet degradation, and provide an enclosed space that protects any enclosed metallic equipment form corrosive atmospheres and/or elements.

Film #5—A 10 mil co-extruded film designed for extended storage of military equipment is prepared as follows:

(1) The outer layer (3+mils) was selected to be blended with 15 parts of flame retardant as disclosed in the masterbatch of Example V and 2.25 parts ultra violet inhibitor additive extruded with 82.75 of low and ultra low density polyethylene.

(2) The next adjacent layer (3+mils) contained 78 parts low and ultra low density polyethylene, 10 parts non-halogenated flame retardant component employed in Example IV, 2 parts ultra violet inhibitor additive, 2 parts pigment and 8 parts of the VCI masterbatch described in Example V.

(3) The next adjacent inwardly directed layer (3+mils) contains the largest amount of vapor corrosion chemical so as to provide maximum corrosion protection to the enclosed equipment. The ratios of ingredients are as follows in the inner layer:
   (a) 15 parts VCI masterbatch from Example V herein;
   (b) 5 parts flame retardant additive from Example V herein;
   (c) 2 parts ultra violet inhibitor additive extruded with 82.75 of low and ultra low density polyethylene;
   (d) 1.5 parts color additive to create a tan or sand tone to the composite; and
   (e) 76.5 parts low and ultra low density polyethylene.

(4) The inner layer (3+mils) contains only vapor phase corrosion inhibitor so as to provide maximum corrosion protection to the enclosed equipment. The ratios of ingredients are as follows:
   (a) 20 parts VCI masterbatch from Example V herein;
   (b) 2 parts ultra violet inhibitor additive extruded with 82.75 of low and ultra low density polyethylene;
   (c) 1.5 parts color additive to create a tan or sand tone to the composite; and
   (d) 76.5 parts low and ultra low density polyethylene.

This arrangement, as set forth, provides maximum protection for articles contained and/or enveloped within the enclosure, with the inner-most layer containing a large amount of VCI material and being arranged in close proximity next adjacent to the enclosed article.

D. GENERAL COMMENTARY

These examples, taken together with the testing of the films formed therefrom, provide workable films containing the desired combination of flame retardant, and VCI components, and anti-static when present. The exposure to the harsh environments which are required in both flame resistance as well as corrosion resistance, together with the results obtained, demonstrate the utility of the present invention for safety as well as long-term corrosion protection. Applications for films prepared in accordance with the teachings of this invention are wide-spread and virtually unlimited, with the formulations providing for long-term protection in spite of the mutually antagonistic properties of the flame retardant and corrosion resistance components.

Generally, to be effective in films, it has been found that the VCI component should be present in an amount ranging from between about 0.5% up to about 1.5% of the film blend. Similarly, effective amounts of the flame retardant component are generally found to be in the range of between about 8% and 15% of the film blend. These quantities provide effective protection throughout these ranges.

One of the features for appropriate selection of components such as set forth herein due to the exposure to two separate heat cycles during the film extrusion operation. These selected components must retain their effectiveness even when extruded and blown into films with temperatures typically ranging as high 335° F.

It will be appreciated that the examples given herein are for purposes of illustration only and are not to be taken as a limitation to which the present invention may be otherwise entitled.

What is claimed is:

1. Plastic resin film for preparing protective enclosures for metallic articles, with the resinous film being impregnated with a blend of a flame retardant component and a corrosion inhibiting component; and with said plastic resinous film being characterized in that:
   (a) said flame retardant component is a mixture of an antimony oxide and a bromoaryl compound, with the antimony oxide component being selected from the group consisting of antimony trioxide and antimony pentoxide, and with the bromoaryl compound having a bromine content ranging from between about 36% and 75% by weight and being selected from the group consisting of decabromodiphenyl oxide, poly (dibromostyrene) and bis-(tribromophenoxy ethane), the antimony element and the bromine being present in the flame retardant mixture in a molar ratio of between about 1 to 2.5 and about 1 to 3.5 respectively; said plastic resin film consisting of a blend of from between about 8% and 12% by weight flame retardant component, from between about 0.5 and 1.5% by weight corrosion inhibiting compound, and the balance being polyethylene resin;

(b) said corrosion inhibiting compound being selected from amine and ammonium salts; and (c) with the flame retardant component and corrosion inhibiting component being combined with polyethylene to form a film modifier mixture.

2. The plastic resinous film as defined in claim 1 being particularly characterized in that said bromoaryl compound is decsbromodiphenyl oxide.

3. The plastic resinous film as defined in claim 1 wherein said corrosion inhibibting compound comprises about 0.1 part dicyclohexylammonium nitrate, about 0.1 part benzotriazole, about 1.5 parts sodium molybdate, and about 1.1 parts sodium nitrite by weight of the entire resinous film composition.

4. The plastic resinous film of claim 1 being particularly characterized in that said resinous film is low density polyethylene film having thermal shrink properties.

5. The plastic resinous film of claim 1 being particularly characterized in that said film contains an ultra-violet transmission inhibitor.

6. Plastic resin film for preparing protective enclosures for metallic articles, said film comprising a laminate having a plurality of resinous film layers, including an inner surface film layer, an outer surface film layer, and one or more internal film layers, each layer being impregnated with at least one additive selected from the group consisting of a flame retardant component, an anti-static component, and a corrosion inhibiting component, with each of the resinous film layers in the laminate being co-extruded with at least one of said additives and wherein:

(a) said flame retardant additive is included in decreasing concentration from the outer surface film layer to the next to inner surface film layer, and wherein the corrosion inhibiting compound is contained in decreasing concentration from the inner surface film layer to the next to the outer surface film layer.

7. Plastic resin film for preparing protective enclosures for metallic articles, with the resinous film being impregnated with a blend of a flame retardant component and a corrosion inhibiting component; and with said plastic resinous film being characterized in that:

(a) said flame retardant component is a mixture of an inorganic oxide and a bromoaryl compound, with the inorganic oxide component being selected from the group consisting of antimony trioxide, antimony pentoxide, and zinc borate, and with the bromoaryl compound having a bromine content ranging from between about 36% and 75% by weight and being selected from the group consisting of decabromodiphenyl oxide, poly (dibromostyrene) and bis-(tribromophenoxy ethane), the inorganic oxide component and the bromine being present in the flame retardant mixture in a molar ratio of between about 1 to 2.5 and about 1 to 3.5, respectively; said plastic resin film consisting of a blend of from between about 8% and 12% by weight flame retardant component, from between about 0.5 and 1.5% by weight corrosion inhibiting compound, and balance being polyethylene resin;

(b) said corrosion inhibiting compound being selected from the group consisting of cyclohexylammonium benzoate, ethanolamine benzoate, amine salts of sebacic acid, and ammonium benzoate and triazoles; and (c) with the flame retardant component and corrosion inhibiting component being combined with polyethylene to form a film modifier mixture.

8. Plastic resin film laminates including an inner surface film layer, an outer surface film layer, and one or more internal film layers for preparing protective enclosures for metallic articles with the layers comprising the laminate being selectively impregnated with a blend of a flame retardant component and a corrosion inhibiting component and with said plastic resinous film being characterized in that:

(a) said flame retardant component is a mixture of an inorganic oxide and a bromoaryl compound, with the inorganic oxide component being selected from the group consisting of antimony trioxide, antimony pentoxide, and zinc borate, and with the bromoaryl compound having a bromine content ranging from between about 36% and 75% by weight and being selected from the group consisting of decabromodiphenyl oxide, poly (dibromostyrene) and bis-(tribromophenoxy ethane), the inorganic oxide component and the bromine being present in the flame retardant mixture in a molar ratio of between about 1 to 2.5 and about 1 to 3.5, respectively; said plastic resin film consisting of a blend of from between about 8% and 12% by weight flame retardant component, from between about 0.5 and 1.5% by weight corrosion inhibiting compound, and balance being polyethylene resin;

(b) said corrosion inhibiting compound being selected from the group consisting of cyclohexylammonium benzoate, ethanolamine benzoate, amine salts of sebacic acid, and ammonium benzoate and triazoles;

(c) with the flame retardant component and corrosion inhibiting component being combined to form a film modifier mixture; and (d) wherein the inner surface resinous film layer is impregnated only with said corrosion inhibiting component, and wherein the outer surface film layer is impregnated only with said flame retardant component, and wherein the internal layers each comprise blends of flame retardant component and corrosion inhibiting component.

9. The plastic resinous film of claim 6 being particularly characterized in that said resinous film is low density polyethylene film having thermal shrink properties.

10. The plastic resinous film of claim 8 being particularly characterized in that at least said outer surface film layer contains an ultra-violet transmission inhibitor.

11. The plastic resinous film of claim 1 wherein said corrosion inhibiting compound is selected from the group consisting of cyclohexylammonium benzoate, ethanolamine benzoate, amine salts of sebacic acid, and ammonium benzoate and triazoles.

12. The plastic resinous film of claim 1 wherein said film modifier mixture includes between about 30% and 40% by weight flame retardant component, between about 5% and 10% by weight corrosion inhibiting component, balance polyethylene.

13. The plastic resinous film of claim 1, including an anti-static component.

* * * * *